United States Patent
Stadelmeier et al.

(10) Patent No.: US 9,866,287 B2
(45) Date of Patent: Jan. 9, 2018

(54) MIMO RECEIVING APPARATUS AND MIMO PREPROCESSING APPARATUS

(71) Applicant: SONY CORPORATION, Tokyo (JP)

(72) Inventors: Lothar Stadelmeier, Stuttgart (DE); Nabil Sven Loghin, Freiburg (DE); Jan Zoellner, Braunschweig (DE); Heimo Guth, Bad-Rippoldsau (DE)

(73) Assignee: SONY CORPORATION, Tokyo (JP)

(*) Notice: Subject to any disclaimer, the term of this patent is extended or adjusted under 35 U.S.C. 154(b) by 145 days.

(21) Appl. No.: 14/771,721

(22) PCT Filed: Feb. 26, 2014

(86) PCT No.: PCT/EP2014/053709
§ 371 (c)(1),
(2) Date: Aug. 31, 2015

(87) PCT Pub. No.: WO2014/135412
PCT Pub. Date: Sep. 12, 2014

(65) Prior Publication Data
US 2016/0020835 A1  Jan. 21, 2016

(30) Foreign Application Priority Data
Mar. 7, 2013 (EP) .................................... 13158230

(51) Int. Cl.
*H04H 20/71* (2008.01)
*H04L 27/00* (2006.01)
(Continued)

(52) U.S. Cl.
CPC ............. *H04B 7/0413* (2013.01); *H04L 1/06* (2013.01); *H04W 72/0473* (2013.01); *H04L 5/0023* (2013.01)

(58) Field of Classification Search
CPC .... H04B 7/0413; H04W 72/0473; H04L 1/06; H04L 5/0023
See application file for complete search history.

(56) References Cited

U.S. PATENT DOCUMENTS

| 8,295,375 | B2 | 10/2012 | Stadelmeier et al. |
| 2011/0026636 | A1* | 2/2011 | Ko ........................ H04L 5/0053 375/295 |
| 2012/0302190 | A1 | 11/2012 | McHenry |

FOREIGN PATENT DOCUMENTS

| EP | 1 990 962 A2 | 11/2008 |
| WO | 03/017529 A1 | 2/2003 |

OTHER PUBLICATIONS

"DVB-TM-MIMO Study Mission", Notes of 1$^{st}$ Telco/Weber, Digital Video Broadcasting, TM-MIMO001XR2, Revision 1, Total 13 Pages, (Feb. 12, 2013), XP017839850.

(Continued)

*Primary Examiner* — Kiet Tang
(74) *Attorney, Agent, or Firm* — Oblon, McClelland, Maier & Neustadt, L.L.P.

(57) ABSTRACT

A MIMO receiving system includes a MIMO antenna apparatus that receives a MIMO transmission signal including at least two MIMO transmission signal streams, wherein the MIMO transmission signal includes one or more MIMO transmission channels and wherein a MIMO transmission channel carrying one or more services includes two MIMO receive signal components covering a same frequency channel and being included in different transmission signal streams. A MIMO preprocessing apparatus preprocesses the MIMO transmission signal and outputs a multiplex signal. One or more receiving apparatus receive the multiplex signal from the output signal path to use a service contained in the single multiplex signal and output a service data stream.

20 Claims, 7 Drawing Sheets

(51) Int. Cl.
  *H04B 7/0413* (2017.01)
  *H04L 1/06* (2006.01)
  *H04W 72/04* (2009.01)
  *H04L 5/00* (2006.01)

(56) References Cited

OTHER PUBLICATIONS

J. Boyer, et al., "MIMO for Broadcast-Results From a High-Power UK Trial", International Broadcasting Conference, Total 8 Pages, (Sep. 6, 2007), XP030081559).
"DVB Technical Module", TM 3565: DVB-T2 Study Mission Report: Final Report v1.0, Digital Video Broadcasting, Total 40 Pages, (May 2006), XP017817188.
International Search Report dated May 23, 2014 in PCT/EP14/053709 Filed Feb. 26, 2014.

* cited by examiner

MIMO RECEIVING APPARATUS AND MIMO PREPROCESSING APPARATUS

BACKGROUND

Field of the Disclosure

The present disclosure relates to a MIMO receiving apparatus and a corresponding MIMO receiving method. The present disclosure relates to a MIMO preprocessing apparatus and a corresponding MIMO preprocessing method. Further, the present invention relates to a MIMO transmitting apparatus and method.

Description of Related Art

MIMO (Multiple Input Multiple Output) can be a significant measure to increase spectral efficiency for terrestrial broadcast systems. Latest standardization activities like DVB-NGH (Digital Video Broadcasting-Next Generation Handheld) have therefore included MIMO as one element of their technical toolset. In case of DVB-NGH the receiver devices are portable or mobile, i.e. they have short stub antennas with limited antenna gain. The capacity analysis of measured MIMO channels have however shown that with increasing SNR the MIMO gain gets more significant. Therefore upcoming standardization activities like ISDB-T, ATSC or DVB-T2 MIMO will include MIMO as a technical element also for terrestrial transmissions to stationary receivers.

One major drawback of MIMO is the increased complexity on signal processing, hardware requirements and network installation. Especially the re-usage of existing consumer home installations is seen as important enabler for the acceptance of a new transmission standard. Current installations of roof-top antennas exist of a directed antenna (e.g. Yagi antenna) with a fixed, single polarization (i.e. horizontal or vertical). The output of the antenna is connected to a single cable either directly to the receiving apparatus (e.g. a TV set or a set-top box) or (with the help of splitters and amplifiers) to different outlets within the house.

For MIMO installations there will be the need of some significant changes of these home installations. On the one hand the so far single polarized antenna has to be exchanged by two different antenna elements. In most cases this will be a cross-polar antenna, i.e. the antenna is able to receive both horizontal and vertical polarizations. The installation of a new rooftop antenna is already a major effort for owners of a house. Even more severe is however the need of a second cable from the two antennas (or cross-polar antenna) to the receiving apparatus (TV set, set-top box, etc.). Typical in-house cable installations consist of a single coaxial cable. The willingness to install a second cable in parallel should be quite low.

EP 1990962 A2 discloses a method and an apparatus for re-transmitting MIMO broadcasting signals to a receiving terminal by using an existing cable without installing an additional cable, when a receiver transmits MIMO broadcasting signals to the receiving terminal via a cable. The MIMO broadcasting method includes restoring an original signal by receiving a MIMO broadcasting signal via a multi-antenna, re-modulating the restored MIMO broadcasting signal, transmitting the re-modulated MIMO broadcasting signal to a receiving terminal via a cable, and demodulating the transmitted MIMO broadcasting signal in the receiving terminal. A MIMO broadcasting signal is re-transmitted, and a radio frequency (RF) signal can be efficiently transmitted via a cable by modulating a plurality of RF signals to a RF broadcasting signal.

In an embodiment a data re-modulator executes FEC (Forward Error Correction) encoding on the MIMO broadcasting signal input from the MIMO broadcasting receiver, attempts streaming parsing, and separates the MIMO broadcasting signal into a plurality of data streams. Then, the data re-modulator re-transmits the signal by performing QAM modulation (modulating 64-QAM to 4096-QAM) and RF up-conversion for each data stream. Here, a plurality of RF channels is selected on a cable, and the channels should be transmitted to a data demodulator in a terminal (for example, a TV set) without interference. In this case, a frequency bandwidth being used is doubled.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a MIMO receiving apparatus and a MIMO preprocessing apparatus that avoid the installation of a second cable as well, but can even more efficiently and flexibly make use of the advantages of MIMO transmission for terrestrial systems. It is a further object to provide a corresponding MIMO receiving method and a MIMO preprocessing method, a MIMO transmitting apparatus and method as well as a corresponding computer program for implementing said methods and a non-transitory computer-readable recording medium for implementing said methods.

According to an aspect there is provided a MIMO receiving apparatus comprising an input interface that receives a multiplex signal from a MIMO preprocessing apparatus on an input signal path, said multiplex signal comprising one or more MIMO transmission channels of a MIMO transmission signal, wherein a MIMO transmission channel carrying one or more services comprises two MIMO receive signal components multiplexed onto said multiplex signal, a signaling unit that signals to said MIMO preprocessing apparatus a channel allocation information indicating the allocation of the two MIMO receive signal components of at least the MIMO transmission channel carrying a desired service that shall be used by said MIMO receiving apparatus to respective frequency channels so that the two MIMO receive signal components of said MIMO transmission channel will be allocated to different frequency channels, a processing unit that processes the two MIMO receive signal components of the MIMO transmission channel carrying the desired service, including tuning to the frequency channels of the respective MIMO receive signal component based on said channel allocation information, to obtain a service data stream, an output interface that outputs said service data stream.

According to a further aspect there is provided a MIMO preprocessing apparatus comprising an input interface that receives a MIMO transmission signal comprising at least two MIMO transmission signal streams received via different input signal paths, wherein said MIMO transmission signal comprises one or more MIMO transmission channels and wherein a MIMO transmission channel carrying one or more services comprises two MIMO receive signal components covering the same frequency channel and being included in different transmission signal streams, a MIMO multiplexer that multiplexes the two MIMO receive signal components of one or more MIMO transmission channels onto a multiplex signal, wherein the two MIMO receive signal components of said one or more MIMO transmission channels are allocated to different frequency channels based on channel allocation information derived from said MIMO transmission signal or received from a MIMO receiving apparatus, and an output interface that outputs said multiplex signal to an output signal path.

According to a further aspect a MIMO transmitting apparatus is presented comprising an input processing unit receiving input data to be transmitted, a Bit Interleaved Coding and Modulation unit that encodes and modulates the received input data and signaling information, said signaling information comprising a channel allocation information indicating the allocation of two MIMO receive signal components of at least a MIMO transmission channel carrying a desired service that shall be used by a MIMO receiving apparatus to respective frequency channels so that the two MIMO receive signal components of said MIMO transmission channel will be allocated to different frequency channels, a MIMO encoding unit that MIMO encodes the output signals of the Bit Interleaved Coding and Modulation unit to obtain two MIMO encoded signal streams, two MIMO transmission antennas that transmit said MIMO encoded signal streams as MIMO transmission signal, wherein said MIMO transmission signal comprises one or more MIMO transmission channels and wherein a MIMO transmission channel carrying one or more services comprises two MIMO receive signal components covering the same frequency channel and being included in different MIMO encoded streams.

According to further aspects a MIMO receiving apparatus a MIMO preprocessing method and a MIMO transmitting method are provided.

According to still further aspects a computer program comprising program means for causing a computer to carry out the steps of the methods disclosed herein, when said computer program is carried out on a computer, as well as a non-transitory computer-readable recording medium that stores therein a computer program product, which, when executed by a processor, causes the methods disclosed herein to be performed are provided.

Preferred embodiments are defined in the dependent claims. It shall be understood that the claimed apparatus, methods, the claimed computer program and the claimed computer-readable recording medium have similar and/or identical preferred embodiments as the claimed MIMO receiving apparatus or the MIMO preprocessing apparatus and as defined in the dependent claims.

One of the aspects of the disclosure is to provide for efficient measures to make sure that the transmission capacity of the available single cable between the MIMO preprocessing apparatus, that receives the MIMO transmission stream from the antennas (i.e. generally a MIMO rooftop antenna), and a MIMO receiving apparatus (e.g. a TV set, set-top box, etc.) is efficiently used. In particular, an efficient signaling concept is provided to make sure that the two MIMO receive signal components of a desired service are reliably transmitted over the single cable without any collisions or interferences with other MIMO receive signal components of other services. This is particularly important if several MIMO receiving apparatus are coupled, over the same single cable, to a single MIMO preprocessing apparatus.

Thus, according an aspect of the disclosure channel allocation information is generated and used, said channel allocation information indicating the allocation of the two MIMO receive signal components of at least a MIMO transmission channel carrying one or more desired services that shall be used by said MIMO receiving apparatus to respective frequency channels. Thus, both the MIMO preprocessing apparatus and the MIMO receiving apparatus know to which frequency portion of the available bandwidth the MIMO receive signal components of the one or more MIMO transmission channel carrying one or more desired services are allocated. Various embodiments for generating and using this channel allocation information are disclosed herein.

It shall be noted that the present invention is not limited to the use in MIMO systems, but can also be used in SIMO (Single Input Multiple Output) systems as well, i.e. diversity reception using a single input stream with two (or more) antennas with two (or more) uncorrelated signals. Hence, whenever reference is made to "MIMO" herein, this shall be understood as meaning MIMO (e.g. distributed MIMO) or SIMO.

Still further, it shall be understood that the present invention is not restricted to the use of two reception antennas for receiving MIMO transmission streams including two MIMO receive signal components. It is also possible to use more than two transmission antennas and/or more than two reception antennas, each reception antenna receiving a MIMO transmission stream (in particular a superposition of signals transmitted from all transmission antennas) carrying MIMO transmission channels including more than two MIMO receive signal components. Thus, in case of using N MIMO signal components it is provided according to the present invention that the channel allocation information ensures that the N MIMO receive signal components are allocated to different frequency channels, e.g. that at least N−1 MIMO receive signal components are shifted to other frequency channels different from the original frequency channel. Hence, whenever reference is made to "two" it shall generally be understood in the sense of "at least two".

The present invention is particularly relevant for broadcast systems, but may generally also be used in other transmission systems, such as unicast systems or communications systems, e.g. according to an LTE or ATSC standard.

It is to be understood that both the foregoing general description and the following detailed description are exemplary, but are not restrictive of the disclosure.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
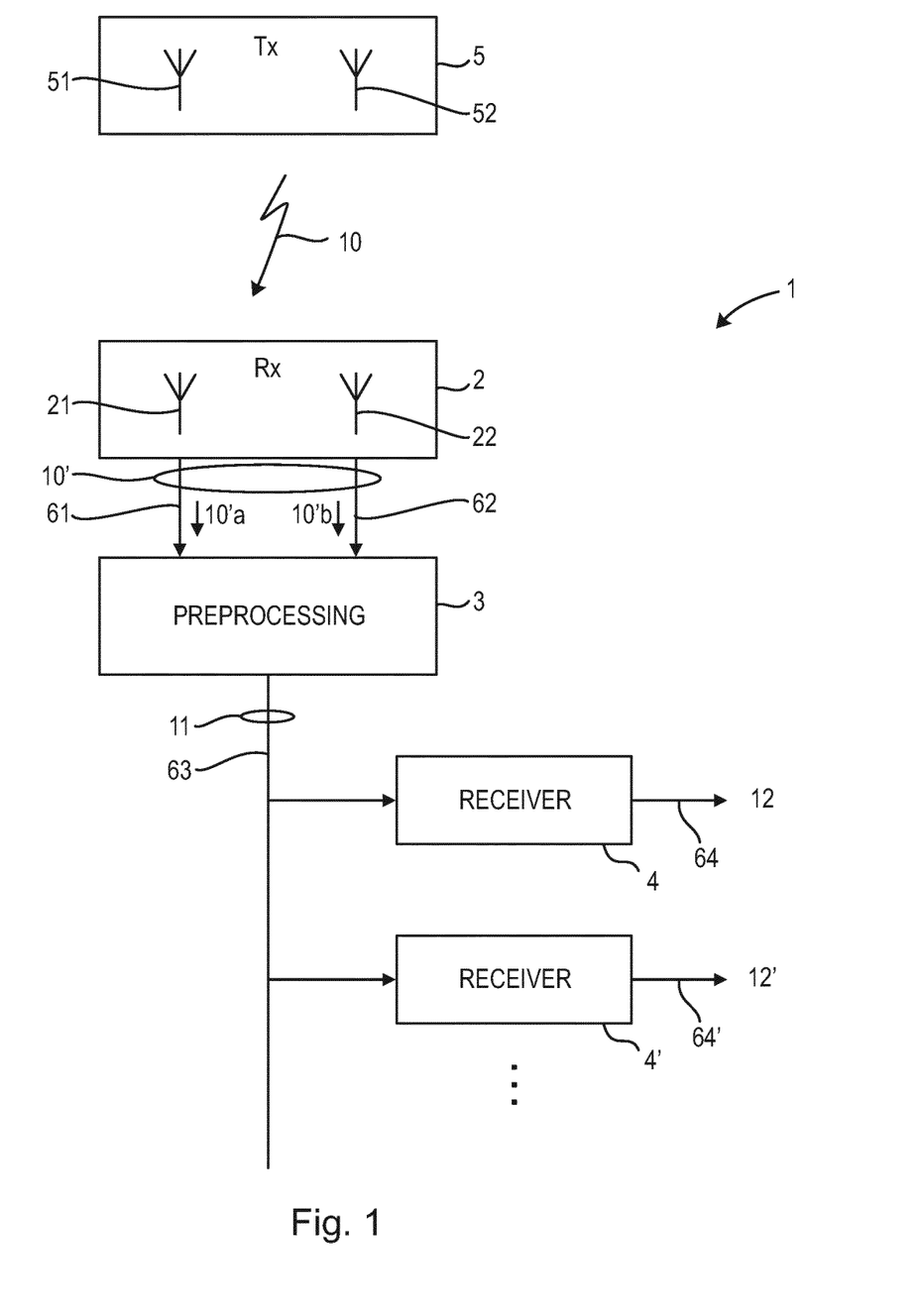
FIG. 1 shows a schematic diagram of the general layout of a MIMO receiving system.

Referring now to the drawings, wherein like reference numerals designate identical or corresponding parts throughout the several views, FIG. 1 shows a schematic diagram of the general layout of a MIMO receiving system 1 according to the present disclosure. It comprises a MIMO antenna apparatus 2, a MIMO preprocessing apparatus 3 and one or more receiving apparatus 4, 4'.

The MIMO antenna apparatus 2 receives a MIMO transmission signal 10 transmitted by a MIMO transmitting apparatus 5, e.g. a MIMO broadcast station comprising two MIMO antennas 51, 52. The MIMO transmission signal 10 comprises at least two MIMO transmission signal streams 10'a, 10'b, wherein said MIMO transmission signal 10 comprises one or more MIMO transmission channels (each carrying one or more services) and wherein MIMO transmission channel carrying one or more services comprises two MIMO receive signal components covering the same frequency channel and being included in different MIMO transmission signal streams 10'a, 10'b. The two MIMO transmission signal streams 10'a, 10'b are e.g. a vertically polarized signal stream and a horizontally polarized MIMO transmission signal stream embedded in the single MIMO transmission signal, which differently polarized MIMO transmission signal streams are received by a cross-polarized antenna or by two differently polarized antennas 21, 22, as schematically depicted in FIG. 1. The MIMO transmission signal stream may alternatively or additionally comprise two (or more) differently embedded MIMO transmission signal streams, e.g. differently polarized MIMO transmission signal streams or spatially decorrelated (or distributed) MIMO transmission signal streams using the same polarization. Generally, the way in which the diversity is achieved within the MIMO transmission signal is not essential for the present invention.

The MIMO preprocessing apparatus 3 receives said MIMO transmission signal 10' as provided by the antennas apparatus 2, in particular said at least two MIMO transmission signal streams 10'a, 10'b via different input signal paths 61, 62 (i.e. one MIMO transmission signal stream per antenna 21, 22 of the MIMO antenna apparatus 2), preprocesses said MIMO transmission signal 10' and outputs a multiplex signal 11 on an output signal path 63 via said single cable to the MIMO receiving apparatus 4, 4'. The MIMO preprocessing apparatus 3 may be represented by a processor that processes said MIMO transmission signal 10', which is preferably arranged close to or integrated in the antenna apparatus 2. Details of the MIMO preprocessing apparatus 3 will be explained below.

Each of the MIMO receiving apparatus 4, 4a receives said multiplex signal 11 via said signal path 63 (i.e. via said single cable) to use a service contained in said multiplex signal 11, processes said multiplex signal 11 and outputs, on an output line 64, 64', a respective service data stream 12, 12' containing the respectively desired service, e.g. a TV channel that a user of the respective MIMO receiving apparatus 4, 4' wants to watch. MIMO receiving apparatus 4, 4a may be represented by a TV set, a set-top box or the like that is able to reproduce a desired service data stream 12, 12' from the received multiplex signal 11.

Figure 2:
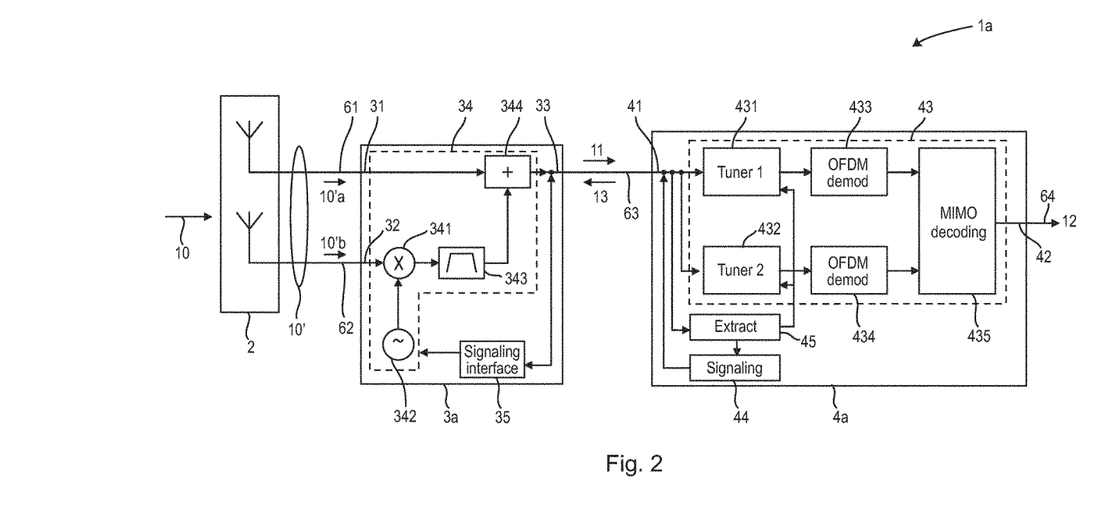
FIG. 2 shows a schematic diagram of a first embodiment of a MIMO preprocessing apparatus and a MIMO receiving apparatus according to the present disclosure.

FIG. 2 shows a schematic diagram of a first embodiment of a MIMO preprocessing apparatus 3a and a MIMO receiving apparatus 4a according to the present disclosure, forming a MIMO receiving system 1a together with the antenna apparatus 2.

The MIMO receiving apparatus 4a comprises an input interface 41 that receives the multiplex signal 11 from the MIMO preprocessing apparatus 3a on an input signal path (i.e. the cable 63). The multiplex signal 11 comprises one or more MIMO transmission channels (each carrying one or more services) of a MIMO transmission signal 10, wherein a MIMO transmission channel carrying one or more services comprises two MIMO receive signal components multiplexed onto said multiplex signal 11, wherein the two MIMO receive signal components are allocated to different frequency channels as will be explained below.

The MIMO receiving apparatus 4a further comprises a processing unit 43 that processes the two MIMO receive signal components of the MIMO transmission channel comprising the desired service. Said processing includes tuning to the frequency channel of the respective MIMO receive signal component based on said channel allocation information (plus OFDM demodulation and following MIMO decoding), to obtain the service data stream 12.

Preferably, as shown in FIG. 2, the processing unit 43 comprises two tuners 431, 432 (i.e. one tuner per MIMO receive signal component) that tune in parallel to the frequency channel of the respective MIMO receive signal component, i.e. one tuner 431 tunes to the frequency channel of the first MIMO receive signal component and the other tuner 432 tunes to the frequency channel of the second MIMO receive signal component of the same MIMO transmission channel comprising the desired service. In an alternative embodiment a common broadband tuner is provided that covers the frequency channels of both MIMO receive signal components.

Further, the processing unit 43 preferably comprises two OFDM demodulators 433, 434 (or a common OFDM demodulator) for demodulating the MIMO receive signal components, and a MIMO decoder 435 for MIMO decoding the demodulated MIMO receive signal components to finally obtain the desired service data stream 12 that it provided at the output interface 42.

The MIMO receiving apparatus 4a further comprises a signaling unit 44 that signals to said MIMO preprocessing apparatus 3a a channel allocation information 13 indicating the allocation of the two MIMO receive signal components of at least a MIMO transmission channel comprising the desired service that shall be used by said MIMO receiving apparatus 4a to respective frequency channels. The channel allocation information 13 is preferably signaled to the MIMO preprocessing apparatus 3a via the cable 63, but may also be signaled through any other path (e.g. through a wireless or wired computer network, a power line using power line communications, etc.). For generating said channel allocation information 13 various embodiments exist.

In one embodiment, as depicted in FIG. 2, the MIMO receiving apparatus 4a comprises a signaling extraction unit 45 that derives said channel allocation information 13 from said multiplex signal 11. The signaling extraction unit 45 thus obtains the multiplex signal 63 and derives, even if not yet all MIMO receive signal components are correctly allocated, sufficient information to generate said channel allocation information 13.

Preferably, said signaling extraction unit 45 is configured to extract a signaling information from said multiplex signal 11 containing said channel allocation information 13. For instance, the MIMO transmission signal 10 (and, thus, also the multiplex signal 11) comprises extra signaling information that can initially be decoded from the multiplex signal 11, in particular from only one of the two MIMO receive signal components.

Said signaling information comprises, in one embodiment a list of available frequency channels, indicating which frequency channels are not occupied. In another embodiment said signaling information comprises a list of predetermined channel assignments, indicating to which frequency channels the MIMO receive signal components of said one or more MIMO transmission channels shall be allocated. This includes the simple case that for every MIMO transmission signal 10 the other frequency (or both, if both MIMO receive signal components are frequency shifted) is embedded in the signalling of the MIMO transmission signal 10.

The channel allocation information 13 may contain channel numbers indicating frequency channels. For instance, channel number 0 corresponds to lowest frequency channel (e.g. the lowest VHF channel), and 1 corresponds to the highest frequency channel (e.g. the highest UHF channel). The channel allocation may be based on look up table. This way of signaling is less flexible in terms of channel allocation changes or local differences (US vs. EU), but provides a way of easy and compact signaling (e.g. 8 bits are sufficient for 256 channels)

The channel allocation information 13 may alternatively contain absolute or relative frequencies indicating frequency channels. For instance, the absolute center frequency in MHz (or 0.5 MHz) steps or the offset in MHz (or 0.5 MHz) steps with respect to the current center frequency may be signaled. This way of signaling is more flexible and independent of the channel allocation pattern, but requires more signaling bits (e.g. 11 bits are required for a 1024 MHz bandwidth with 0.5 MHz resolution).

Said signaling information is preferably generated originally from the MIMO transmitting apparatus, e.g. a transmission station that also generates the MIMO transmission signal. The obtained channel allocation information 13 is provided by the signaling extraction unit 45 not only to the signaling unit 44, but also to the tuners 431, 432 to enable them to correctly tune to the corresponding frequency channel of the MIMO transmission channel carrying the desired service as indicated by the channel allocation information 13.

The MIMO preprocessing apparatus 3a comprises an input interface 31, 32 that receives a MIMO transmission signal 10' comprising at least two MIMO transmission signal streams 10'a, 10'b received via different input signal paths 61, 62. Said MIMO transmission signal 10' comprises one or more services. A MIMO transmission channel carrying one or more services comprises two MIMO receive signal components covering the same frequency channel (often completely the same frequency channel) and being included in different transmission signal streams 10'a, 10'b. Further, the MIMO preprocessing apparatus 3a comprises a MIMO multiplexer 34 that multiplexes the two MIMO receive signal components of one or more MIMO transmission channels onto a (single) multiplex signal 11, wherein the two MIMO receive signal components are allocated to different frequency channels based on the channel allocation information 13 received from the MIMO receiving apparatus 44. The multiplex signal 11 is output to an output signal path 63 via an output interface 33.

For receiving the channel allocation information 13 signaled from the signaling unit 44 a signaling interface 35 is preferably provided. The received channel allocation information 13 is provided to the MIMO multiplexer 34 for multiplexing the two MIMO receive signal components of at least the MIMO transmission channel carrying a desired service.

In the embodiment shown in FIG. 2 said MIMO multiplexer 34 comprises a mixer 341 for mixing the second MIMO receive signal component received at the second input interface 32 with a mixing frequency of an oscillator 342, said mixing frequency being controlled (directly or indirectly) by said channel allocation information 13. The upconverted second MIMO receive signal component is then filtered in a bandpass filter 343 and finally added in an addition unit 344 to the first MIMO receive signal component received at said first input interface 31.

In the embodiment said MIMO multiplexer 34 is configured to multiplex the two MIMO receive signal components of all MIMO transmission channels onto said single multiplex signal 11 based on a list of available frequency channels, indicating which frequency channels are not occupied, as channel allocation information 13. This is schematically illustrated in FIGS. 3A and 3B showing a diagram illustrating the channel allocation of MIMO receive signal components according to a first embodiment.

Figure 3A:
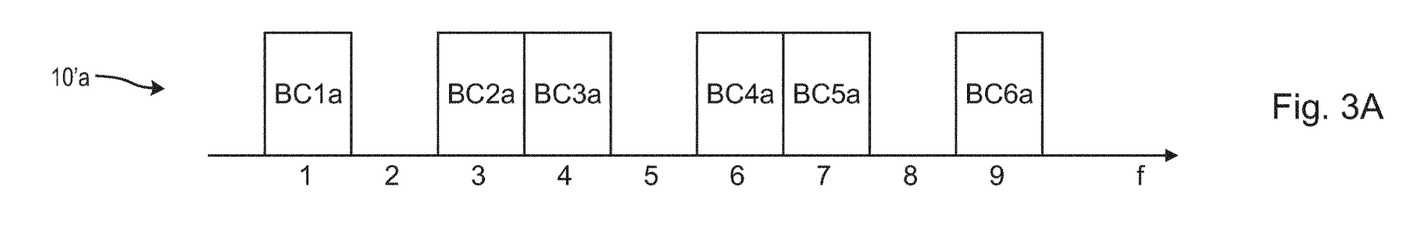
FIGS. 3A-3F show diagrams illustrating the channel allocation of MIMO receive signal components according to a various embodiments.
Figure 3B:
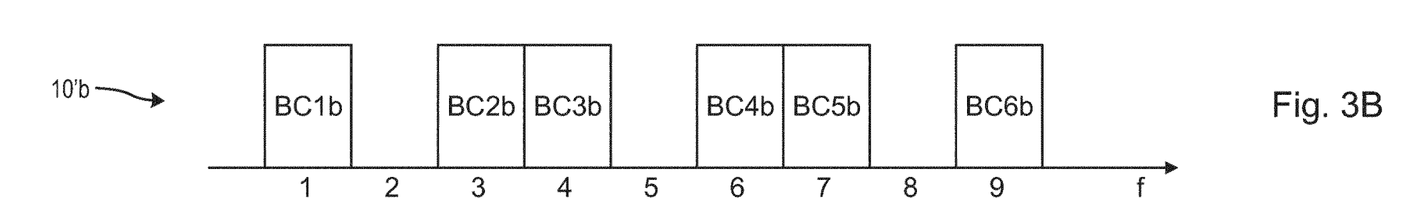

FIGS. 3A and 3B show the channel allocation of various MIMO transmission channels within the MIMO transmission signal 10', i.e. before application of any multiplexing in the MIMO preprocessing apparatus 3a. FIG. 3A shows the MIMO transmission stream 10'a as received at a first reception antenna and transmitted over the first input signal path 61, and FIG. 3B shows the MIMO transmission stream 10'b as received at a second reception antenna and transmitted over the second input signal path 62. In the MIMO transmission signal both MIMO receive signal components of the respective MIMO transmission channels (each carrying one or more services) are allocated to the same frequency channel but e.g. with different polarization. For instance, both MIMO receive signal components BC1a, BC1b of MIMO transmission channel BC1 are allocated to the frequency channel 1 (which is a physical RF channel), both MIMO receive signal components BC2a, BC2b of MIMO transmission channel BC2 are allocated to the frequency channel 3 (which is another physical RF channel), etc. Frequency channels 2, 5 and 8 are not occupied which is indicated by the list of available frequency channels provided to the MIMO preprocessing apparatus 3a as channel allocation information 13.

Figure 3C:
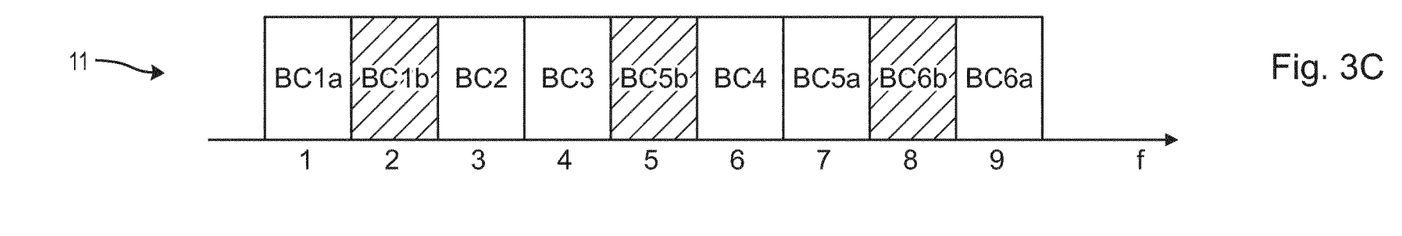

FIG. 3C shows the channel allocation of the various MIMO receive signal components within the multiplex signal 11, i.e. after application of the multiplexing in the MIMO preprocessing apparatus 3a by use of the list of available frequency channels. For this example it shall be assumed that MIMO transmission channels BC1, BC5 and BC6 shall be used by different MIMO receiving apparatus. This is preferably signaled to the MIMO preprocessing apparatus 3a by the signaling units of the respective MIMO receiving apparatus as service information which is received and evaluated by the signaling interface 35 of the MIMO preprocessing apparatus 3a. In the example illustrated in FIG. 3C for each of these MIMO transmission channels BC1, BC5 and BC6 one of the MIMO receive signal components BC1a, BC5a and BC6a is kept on its channel, while the other MIMO receive signal components BC1b, BC5b and BC6b are shifted to the available frequency channels 2, 5 and 8.

The list of available frequency channels is preferably included in a signaling information included in the MIMO transmission signal, e.g. as L1-pre or L1-config signaling information as conventionally used in broadcast systems in accordance with various DVB standards (e.g. the DVB-T2 standard). Thus, in the above example this list of available frequency channels comprises the information that the frequency channels 2, 5 and 8 are free in the spectrum occupied by the MIMO transmission signal.

Figure 3D:
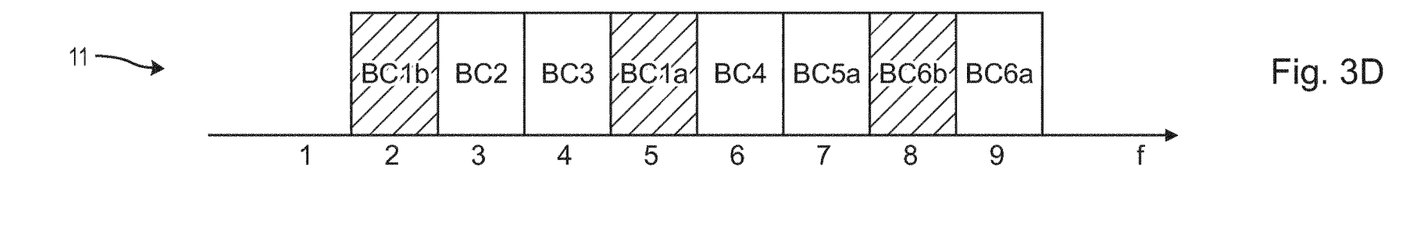

In one embodiment, as illustrated in FIG. 3C, the MIMO multiplexer 34 is configured to shift only one of the two MIMO receive signal components of the MIMO transmission channel comprising the desired one or more services to a different frequency channel than the frequency channel in which the MIMO receive signal components are originally included in the MIMO transmission signal 10. In another embodiment, as illustrated in FIG. 3D, both MIMO receive signal components of the MIMO transmission channel comprising the desired one or more services are shifted to a different frequency channel, e.g. the MIMO receive signal component BC a could be shifted to frequency channel 5 and the MIMO receive signal component BC1b could be shifted to frequency channel 2. In still another embodiment the MIMO multiplexer 34 is configured to shift the stronger MIMO receive signal component of the MIMO transmission channel comprising a desired service to a frequency channel at a higher frequency (having a higher cable attenuation) than the weaker MIMO receive signal component of the MIMO transmission channel comprising the same service (having a lower cable attenuation). This decreases the level difference of the two MIMO receive signal components at the input of the terrestrial MIMO receiving apparatus.

Figure 3E:
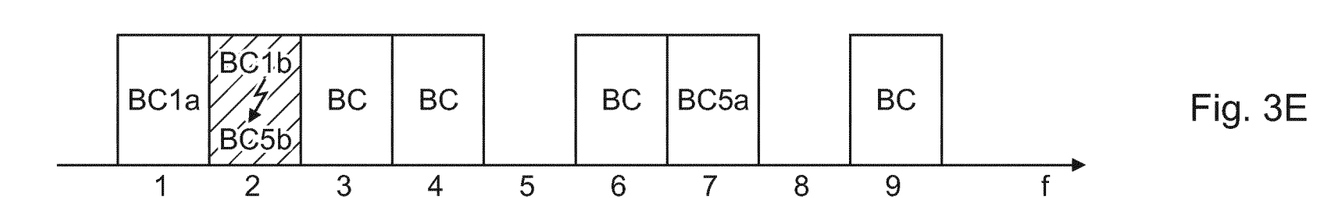

Generally, a particular MIMO receiving apparatus is not aware of the frequency channel occupancy by other MIMO receiving apparatus, i.e. there might be conflicts between the channel allocation information received by the MIMO preprocessing apparatus 3a from different MIMO receiving apparatus 4a. For instance a first MIMO receiving apparatus might instruct the MIMO preprocessing apparatus 3a to shift the MIMO receive signal component BC1b to frequency channel 2 and a second MIMO receiving apparatus might instruct the MIMO preprocessing apparatus 3a to shift the MIMO receive signal component BC5b to frequency channel 2 leading to the conflict in frequency channel 2 as illustrated in FIG. 3E.

One solution to this potential problem is that the signaling extraction unit 45 that derives said channel allocation information from said multiplex signal 11 by spectrum sensing of the spectrum of the multiplex signal 11, e.g. by use of a power threshold. In this way it is detected if and which channels are already occupied and which frequency channels are still free. This spectrum sensing may be made as an alternative or in addition to deriving the list of available frequency channels. Conflicts as described above can thus be efficiently avoided. This spectrum sensing may take place in the MIMO receiving apparatus 4a (e.g. in the signaling extraction unit 45) or in the MIMO preprocessing apparatus 3a (e.g. in a signaling extraction unit). If the measurement is carried out in the MIMO receiving apparatus 4a, the MIMO preprocessing apparatus 3a signals the channel selection and allocates the corresponding MIMO transmission channel to the requested frequency channel.

Another solution to avoid such conflicts is to include the information to which frequency channel the MIMO receive signal components of the desired service(s) are to be shifted in the channel allocation information provided to the MIMO preprocessing apparatus 3a by the (one or more) MIMO receiving apparatus 4a. In other words, a list of predetermined channel assignments, indicating to which frequency channels the MIMO receive signal components of the MIMO transmission signal comprising the desired service(s) shall be allocated, is provided as channel allocation information to the MIMO preprocessing apparatus 3a. This list of predetermined channel assignments may be agreed upon in advance or on the fly by all the MIMO receiving apparatus, or may be signaled by the MIMO transmitting apparatus (e.g. a transmission station). Thus, the channel allocation information derived by the MIMO receiving apparatus 3a from the multiplex signal (in particular any signaling information embedded therein) does not only include information of the unoccupied frequency channels, but also information of the fixed channel allocations for some (preferably all) services. For instance, the information may be included of the form: MIMO receive signal component BC1b shall be shifted to frequency channel 2, MIMO receive signal component BC5b shall be shifted to frequency channel 5, etc.

According to still another solution the channel allocation is decided by the MIMO preprocessing apparatus 3a and the decided allocation is fed back as information to the (one or more) MIMO receiving apparatus 4a so that the tuner(s) of said (one or more) MIMO receiving apparatus 4a can appropriately tune to the correct frequency channels where the MIMO receive signal components of the desired service(s) are located. The MIMO preprocessing apparatus 3a may also decide the channel allocation based on spectrum sensing. The selected channel is then fed back as information to the (one or more) MIMO receiving apparatus 4a via the signaling link.

The advantages of using a fixed channel allocation are that no collisions as illustrated in FIG. 3E are possible and that other measures, like the above described spectrum sensing by the MIMO receiving apparatus, are not required. Further, multiple requests of the same MIMO receive signal component to different frequency channels are generally not possible. Still further, the signaling overhead can be reduced since generally only one frequency channel per second MIMO receive signal component needs to be signaled instead of a list of all available frequency channels. In this case the amount of signaling information provided via the transmission signal is typically reduced. Instead of signaling the frequencies of all available frequency channels (e.g. 10 frequency channels) only the allocations for the frequency channels are signaled (e.g. in case of two services: The second MIMO receive signal component located in frequency channel 1 is to be mapped to channel 3 and the second MIMO receive signal component located in frequency channel 5 is to be mapped to channel 7). In other words, if several MIMO receiving apparatus want to decode the same service, all use the same channel allocation.

However, this embodiment requires a sufficient number of free frequency channels in the terrestrial spectrum, i.e. the spectrum of the MIMO transmission signal since generally two frequency channels per MIMO transmission channel (for the two MIMO receive signal components) are required.

The number of required mixers in a multiuser environment (in case of one MIMO preprocessing apparatus that serves several MIMO receiving apparatus (i.e. users) in one or more households) is at least one per user (since generally each user may use a different service, e.g. watch a different channel) and at maximum N corresponding to the number of services.

Figure 3F:
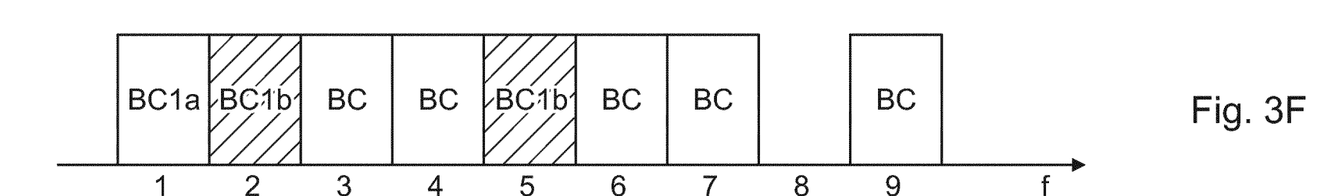

Generally, it might also happen that different MIMO receiving apparatus provide different instructions to shift the same MIMO receive signal component of a particular MIMO transmission channel to different frequency channels leading to an unnecessary redundancy and, thus, a waste of available resources. For instance a first MIMO receiving apparatus might instruct the MIMO preprocessing apparatus $3a$ to shift the MIMO receive signal component BC1$b$ to frequency channel 2 and a second MIMO receiving apparatus might instruct the MIMO preprocessing apparatus $3a$ to shift the MIMO receive signal component BC1$b$ to frequency channel 5 leading to occupancy of frequency channels 2 and 5 by the same MIMO receive signal component BC1$b$ as illustrated in FIG. 3F.

A solution to this problem can be achieved by use of bidirectional signaling between the MIMO preprocessing apparatus and the MIMO receiving apparatus to signal the to the MIMO receiving apparatus the allocated frequency channels and to avoid unnecessary redundancy. Without such a bidirectional signaling one free channel is generally required per user, whereas with bidirectional signaling one free channel per service (or MIMO transmission signal) is generally required.

This bidirectional signaling is also exploited in an embodiment according to which the input interface 41 of the MIMO receiving apparatus 4a is configured to receive error information in response to the service information and said channel allocation information if the frequency channel indicated by said channel allocation information is already occupied by a MIMO receive signal component of a different MIMO transmission channel or service. Further, in an embodiment the input interface 41 is configured to receive channel occupation information indicating to which frequency channels the MIMO receive signal components of one or more MIMO transmission channels or services have actually been allocated.

Generally, the way in which the communication between the MIMO preprocessing apparatus 3a and the MIMO receiving apparatus 4a happens is not essential for the present disclosure. In a preferred embodiment the input interface 41, the signaling unit 44 and the signaling interface 35 are configured to receive and/or signal information using the DiSEqC (Digital Satellite Equipment Control protocol (or a similar protocol using control commands such as JESS (JULTEC Enhanced Stacking System)).

Figure 4:
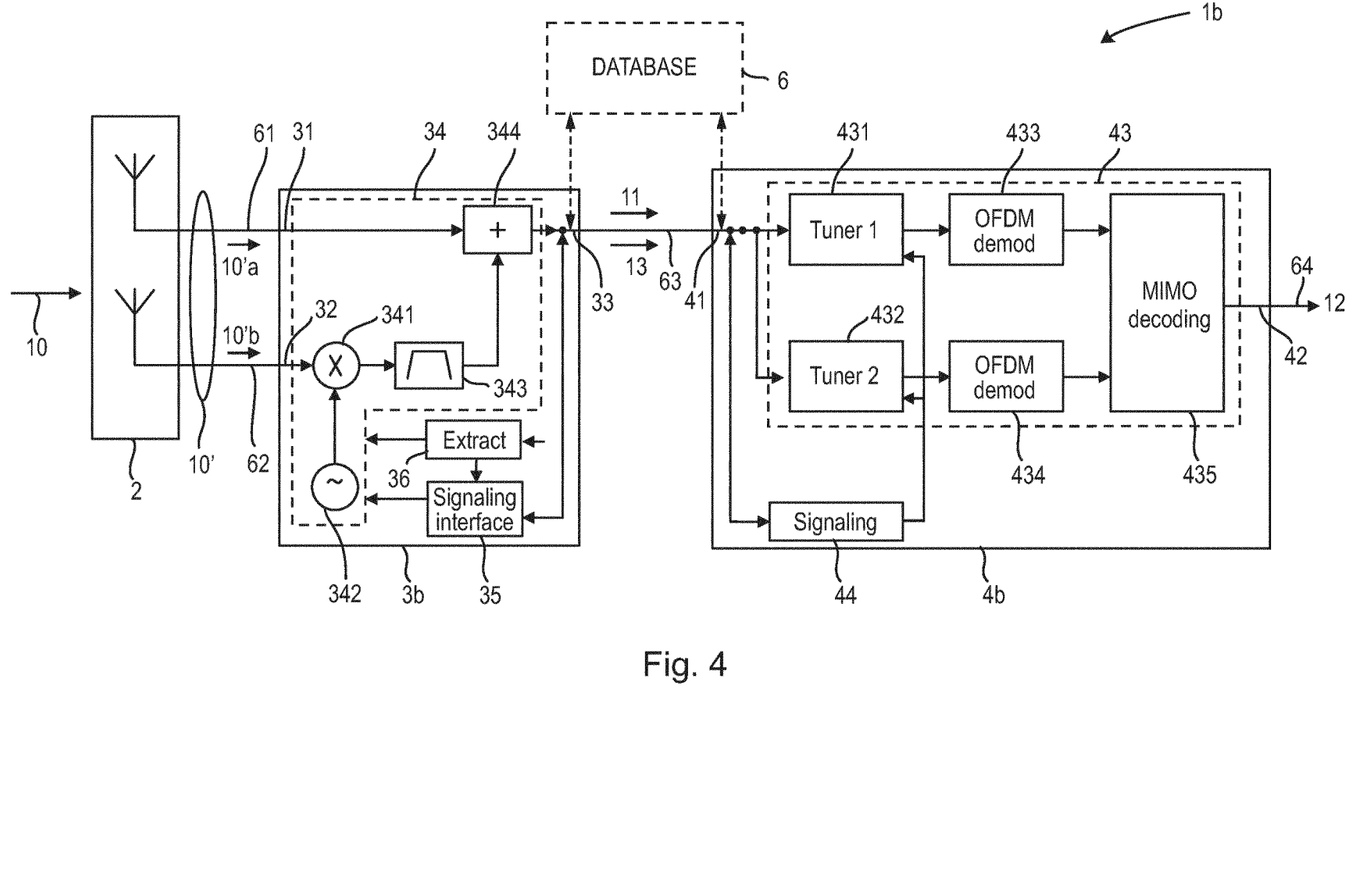
FIG. 4 shows a schematic diagram of a second embodiment of a MIMO preprocessing apparatus and a MIMO receiving apparatus according to the present disclosure.

FIG. 4 shows a schematic diagram of a second embodiment of a MIMO preprocessing apparatus 3b and a MIMO receiving apparatus 4b according to the present disclosure, forming a MIMO receiving system 1b together with the antenna apparatus 2. According to this embodiment the MIMO preprocessing apparatus 3b also comprises an input interface 31 for receiving the MIMO transmission signal 10', a MIMO multiplexer 34 for multiplexing the two MIMO receive signal components of one or more MIMO transmission channels onto a multiplex signal, and an output interface 33 for outputting said multiplex signal 11 to the output signal path 63. However, in contrast to the MIMO preprocessing apparatus 3a, the channel allocation 13 is derived from the MIMO transmission signal 10' by the MIMO preprocessing apparatus 3b and is not received from the MIMO receiving apparatus 4b.

For deriving the channel allocation information 13 generally the same options and embodiments exist that have been explained above with reference to FIGS. 2 and 3, in particular for the signaling extraction unit 45 of the MIMO receiving apparatus 4a. Preferably, a signaling extraction unit 36 is now provided in the MIMO preprocessing apparatus 3b for deriving the channel allocation information 13. The derived channel allocation information 13 is then provided to the MIMO multiplexer 34 for channel allocation in the way as explained above. Further, the channel allocation information 13 is also provided to the MIMO receiving apparatus 4b via the signaling interface 35 and the signaling unit 44 (preferably via the cable 63, but generally in any suitable way) which provides the tuners 431, 432 with this information accordingly.

In other embodiments the channel allocation information 13 is also extracted in parallel by the MIMO signal receiving apparatus itself, e.g. by use of a signaling extraction unit 45, or the channel allocation information is agreed upon in advance or predetermined.

All other explanations, in particular about how to derive the channel allocation information, how to transmit it between the MIMO preprocessing apparatus and the MIMO receiving apparatus and about the functions and operation of the MIMO preprocessing apparatus and the MIMO receiving apparatus, as provided above, in particular with respect to the first embodiment shown in FIG. 2 generally apply to the second embodiment shown in FIG. 4 as well.

In still another embodiment the input interface 41 (or the signaling unit 44) and/or the signaling interface 35 are configured to exchange channel allocation information indicating to which frequency channels the MIMO receive signal components of one or more MIMO transmission channels shall be allocated and/or channel occupation information channel occupation information indicating to which frequency channels the MIMO receive signal components of one or more MIMO transmission channels have actually been allocated with a channel information database 6, schematically shown in broken lines in FIG. 4 (but may also be used in the embodiment shown in FIG. 2). Said database 6 may also be provided with channel allocation information directly from a transmitting device or a broadcast service operator. By use of this database 6 the above described problems of collisions and unnecessary redundancies can be efficiently avoided.

Figure 5:
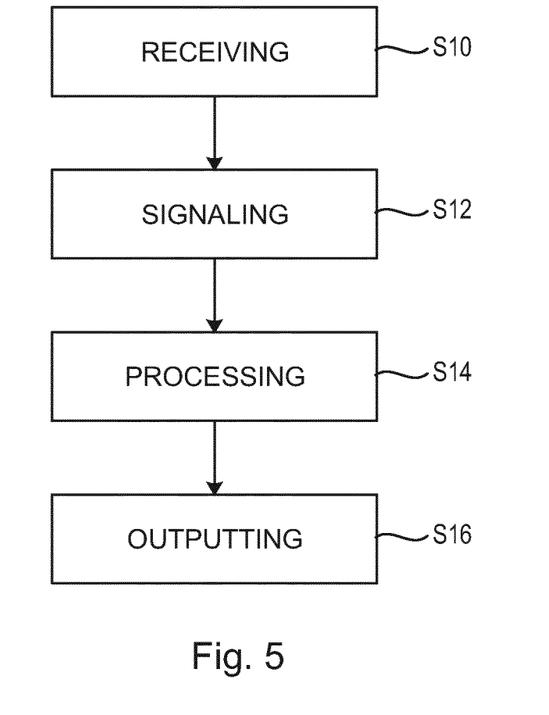
FIG. 5 shows a flowchart of an embodiment of a MIMO receiving method according to the present disclosure.

A flowchart of a MIMO receiving method is depicted in FIG. 5. In a first step S10 receiving a multiplex signal is received from a MIMO preprocessing apparatus on an input signal path, said multiplex signal comprising one or more MIMO transmission channels (each carrying one or more services) of a MIMO transmission signal, wherein MIMO transmission channel carrying one or more services comprises two MIMO receive signal components multiplexed onto said multiplex signal. In a second step S12 a channel allocation information indicating the allocation of the two MIMO receive signal components of at least a MIMO transmission channel carrying a desired service that shall be used by said MIMO receiving method to respective frequency channels is signaled to said MIMO preprocessing apparatus. In a third step S14 the two MIMO receive signal components of the MIMO transmission channel carrying the desired service including tuning to the frequency channel of the respective MIMO receive signal component based on said channel allocation information to obtain a service data stream are processed. In a fourth step S16 said service data stream is output, e.g. rendered on a TV screen.

Figure 6:
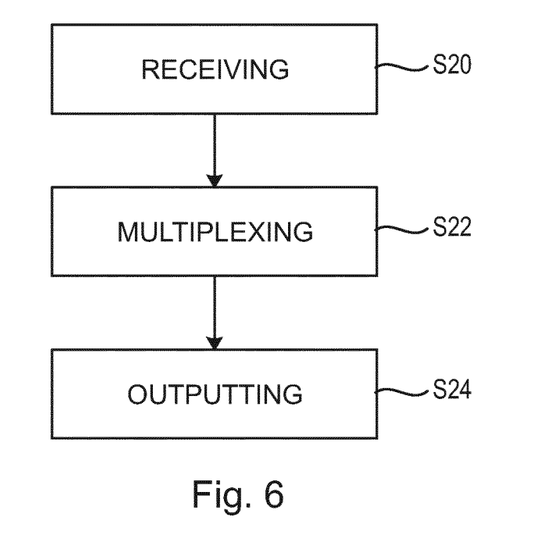
FIG. 6 shows a flowchart of an embodiment of a MIMO preprocessing method according to the present disclosure.

A flowchart of a MIMO preprocessing method is depicted in FIG. 6. In a first step S20 a MIMO transmission signal is received, said MIMO transmission signal comprising at least two MIMO transmission signal streams received via different input signal paths, wherein said MIMO transmission signal comprises one or more MIMO transmission channels and wherein a MIMO transmission channel carrying one or more services comprises two MIMO receive signal components covering the same frequency channel (generally covering complete the same frequency channel, but theoretically covering at least partially the same frequency channel) and being included in different transmission signal streams. In a second step S22 the two MIMO receive signal components of MIMO transmission channels one or more MIMO transmission channels are multiplexed onto a multiplex signal, wherein the two MIMO receive signal components of a MIMO transmission channel carrying a desired service are allocated to different frequency channels based on channel allocation information derived from said MIMO transmission signal or received from a MIMO receiving apparatus. In a third step S24 said multiplex signal is output to an output signal path, in particular for use by the MIMO receiving apparatus.

Figure 7:
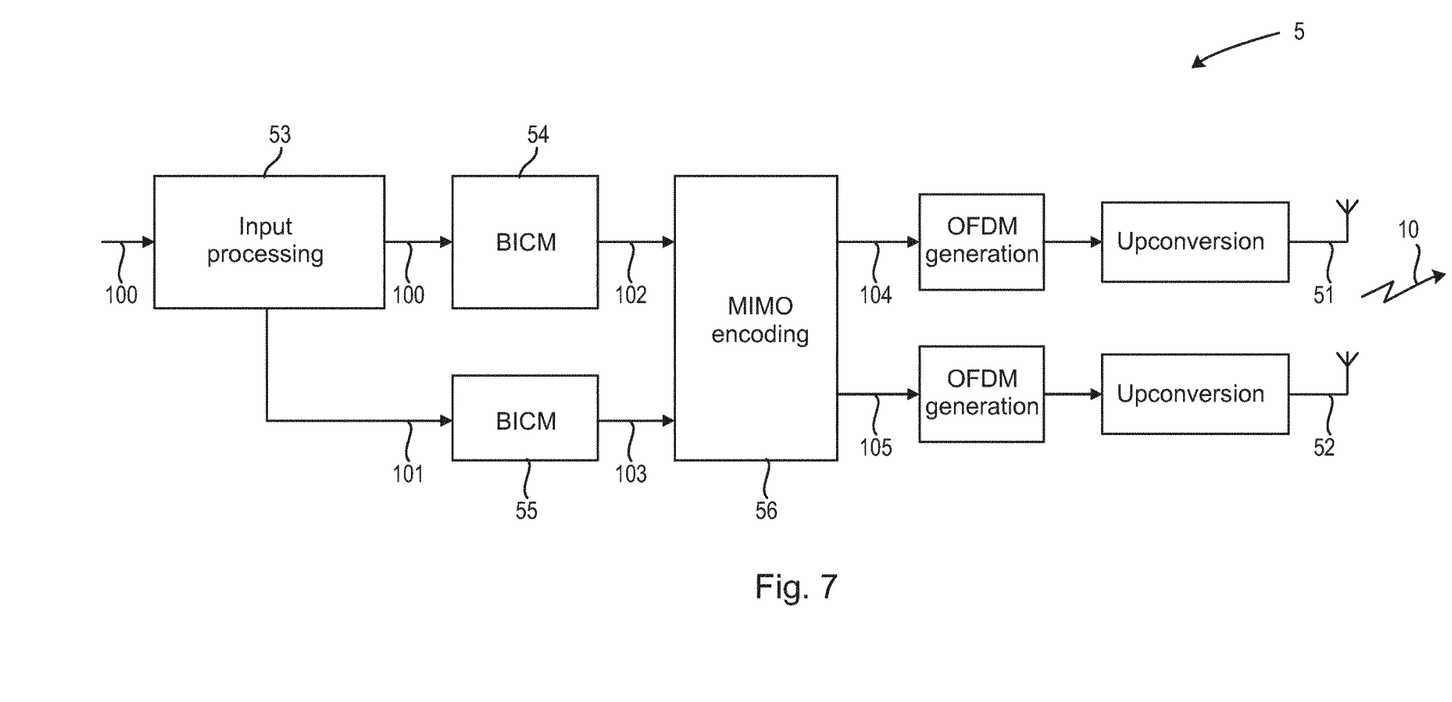
FIG. 7 shows a schematic diagram of an embodiment of a transmitting apparatus according to the present disclosure.

FIG. 7 shows schematic diagram of an embodiment of a transmitting apparatus 5 according to the present disclosure. This embodiment of the transmitting apparatus 5, which is e.g. a MIMO or SIMO broadcast station, comprises two MIMO antennas 51, 52. Further, similar as in a transmitting apparatus according to the DVB-T2 standard, the transmitting apparatus 5 comprises a input processing unit 53 receiving input data 100 to be transmitted. The processed input data 101 and signaling information 102 (e.g. including the channel allocation information as explained above) are provided to a respective (or a common) Bit Interleaved Coding and Modulation (BICM) units 54, 55. The output signals 102, 103 of the BICM units 54, 55 are MIMO encoded in a MIMO encoding unit 56 to obtain two MIMO encoded signal streams 104, 105. These are then provided to OFDM generation units 57, 58 and to upconverters 59, 60, before they are transmitted as MIMO transmission signal 10 (in particular as separate MIMO streams each carrying a MIMO signal components of MIMO transmission channels, each MIMO transmission channel carrying one or more services).

The signaling information can be encoded in the MIMO transmission signal 10 in various ways as explained above. One example is to embed the signaling information in a L1 signaling block. For instance, a separate entry can be provided in the L1 signaling block carrying the channel allocation information, which may carry various information as explained above.

In summary, the present solution overcomes the need for installation of a second cable in case of using the concept of MIMO within terrestrial transmission systems. This substantially eases the introduction of a terrestrial MIMO system to stationary roof-top antenna systems. One idea is to re-use the existing cable to convey both MIMO receive signal components received at different reception paths (e.g. with different signal polarizations) on different frequencies. For example, one signal polarization is fed directly to the cable, while the signal of the other polarization is shifted to an unused frequency.

The frequency bands to which the MIMO receive signal components are shifted could be for example at (fixed, pre-defined or signaled) frequencies that are not or no longer used for terrestrial transmissions (e.g. digital dividend frequency bands). Further, frequency bands may be used that are not used at the specific location. For instance, due to the complicated terrestrial frequency planning only a small subset of channels are allocated at a specific location, which is however is no longer true as soon as the signal 'entered' the inhouse cabling, i.e. so far unallocated channels can be used for distributing MIMO reception paths. This ensures to have no disturbance with the existing terrestrial signals. In an embodiment the complete spectrum of the second MIMO receive signal components is shifted to an unused spectral range.

Frequency offset calculations as well as synchronization mechanisms and phase noise compensation schemes are generally not affected since generally every reception path performs its own synchronization and offset calculation. No real performance penalty or receiver complexity increase is expected.

The demodulation of the MIMO transmission signal could be completely done on the rooftop. In this case the rooftop device outputs a consistent transport stream (the multiplex signal) which is re-modulated to a suitable format (e.g. to DVB-T2 (SISO) format, if the capacity is high enough, to DVB-C or DVB-C2 format or a similar format, or even to other formats like IP streams, e.g. encapsulated into a PLC system and using the single coaxial cable).

Another advantage can be provided in mixed SISO/MIMO transmissions. In this case a SISO transmission is left on the unchanged frequency which means that no action is needed for SISO receivers leading to a complete transparency.

Obviously, numerous modifications and variations of the present disclosure are possible in light of the above teachings. It is therefore to be understood that within the scope of the appended claims, the disclosure may be practiced otherwise than as specifically described herein.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

Any reference signs in the claims should not be construed as limiting the scope.

It follows a list of further embodiments of the disclosed subject matter.
1. A MIMO receiving apparatus comprising
an input interface that receives a multiplex signal from a MIMO preprocessing apparatus on an input signal path, said multiplex signal comprising one or more MIMO transmission channels of a MIMO transmission signal, wherein a MIMO transmission channel carrying one or more services comprises two MIMO receive signal components multiplexed onto said multiplex signal, MIMO receive signal component
a signaling unit that signals to said MIMO preprocessing apparatus a channel allocation information indicating the allocation of the two MIMO receive signal components of at least the MIMO transmission channel carrying a desired service that shall be used by said MIMO receiving apparatus to respective frequency channels so that the two MIMO receive signal components of said MIMO transmission channel will be allocated to different frequency channels,
a processing unit that processes the two MIMO receive signal components of the MIMO transmission channel carrying the desired service, including tuning to the frequency channels of the respective MIMO receive signal component based on said channel allocation information, to obtain a service data stream,
an output interface that outputs said service data stream.
2. The MIMO receiving apparatus as defined in embodiment 1,
further comprising a signaling extraction unit that derives said channel allocation information, in particular a signaling information containing said channel allocation information, from said multiplex signal.
3. The MIMO receiving apparatus as defined in embodiment 2,
wherein said signaling extraction unit is configured to derive said channel allocation information based on a power measurement of said multiplex signal.
4. The MIMO receiving apparatus as defined in embodiment 3,
wherein said signaling extraction unit is configured to derive a list of available frequency channels, indicating which frequency channels are not occupied, as channel allocation information.
5. The MIMO receiving apparatus as defined in embodiment 3,
wherein said signaling extraction unit is configured to derive a list of predetermined channel assignments, indicating to which frequency channels the MIMO receive signal components of said one or more MIMO transmission channels shall be allocated, as channel allocation information.
6. The MIMO receiving apparatus as defined in embodiment 4 or 5,
wherein said channel allocation information contains channel numbers indicating frequency channels.
7. The MIMO receiving apparatus as defined in embodiment 4 or 5,
wherein said channel allocation information contains absolute or relative frequencies indicating frequency channels.
8. The MIMO receiving apparatus as defined in any preceding embodiment 1,
wherein said signaling unit is configured to signal to said MIMO preprocessing apparatus a service information indicating which desired service said MIMO receiving apparatus wants to use.
9. The MIMO receiving apparatus as defined in embodiment 8,
wherein said input interface is configured to receive error information in response to said service information and said channel allocation information if the frequency channel indicated by said channel allocation information is already occupied by a MIMO receive signal component of a different MIMO transmission channel.
10. The MIMO receiving apparatus as defined in any preceding embodiment 1,
wherein said input interface is configured to receive channel occupation information indicating to which frequency channels the MIMO receive signal components of one or more MIMO transmission channels have actually been allocated.
11. The MIMO receiving apparatus as defined in any preceding embodiment 1,
wherein said input interface and/or said signaling unit are configured to receive and/or signal information using the Digital Satellite Equipment Control protocol or the JULTEC Enhanced Stacking System protocol.
12. The MIMO receiving apparatus as defined in any preceding embodiment 1,
wherein said input interface is configured to exchange channel allocation information indicating to which frequency channels the MIMO receive signal components of one or more MIMO transmission channels shall be allocated and/or channel occupation information channel occupation information indicating to which frequency channels the MIMO receive signal components of one or more MIMO transmission channels have actually been allocated with a channel information database.
13. A MIMO receiving method comprising
receiving a multiplex signal from a MIMO preprocessing apparatus on an input signal path, said multiplex signal comprising one or more MIMO transmission channels of a MIMO transmission signal, wherein a MIMO transmission channel carrying one or more services comprises two MIMO receive signal components multiplexed onto said multiplex signal, MIMO receive signal component
signaling to said MIMO preprocessing apparatus a channel allocation information indicating the allocation of the two MIMO receive signal components of at least a MIMO transmission channel carrying a desired service that shall be used by said MIMO receiving method to respective frequency channels, so that the two MIMO receive signal components of said MIMO transmission channel will be allocated to different frequency channels,
processing the two MIMO receive signal components of the MIMO transmission channel carrying the desired service including tuning to the frequency channel of the respective MIMO receive signal component based on said channel allocation information to obtain a service data stream,
outputting said service data stream.
14. A MIMO preprocessing apparatus comprising:
an input interface that receives a MIMO transmission signal comprising at least two MIMO transmission signal streams received via different input signal paths, wherein said MIMO transmission signal comprises one or more MIMO transmission channels and wherein a MIMO transmission channel carrying one or more services comprises two MIMO receive signal components covering the same frequency channel and being included in different transmission signal streams,
a MIMO multiplexer that multiplexes the two MIMO receive signal components of one or more MIMO transmission channels onto a multiplex signal, wherein the two MIMO receive signal components of said one or more MIMO transmission channels are allocated to different frequency channels based on channel allocation information derived from said MIMO transmission signal or received from a MIMO receiving apparatus, and an output interface that outputs said multiplex signal to an output signal path.

15. The MIMO preprocessing apparatus as defined in embodiment 14,
wherein said MIMO multiplexer is configured to multiplex the two MIMO receive signal components of all MIMO transmission channels onto said single multiplex signal based on a list of predetermined channel assignments, indicating to which frequency channels the MIMO receive signal components of said one or more MIMO transmission channels shall be allocated, as channel allocation information.

16. The MIMO preprocessing apparatus as defined in embodiment 14 or 15,
wherein said MIMO multiplexer is configured to shift only one or both of the two MIMO receive signal components of one or more MIMO transmission channels to a different frequency channel than the frequency channel in which the MIMO receive signal components are included in the MIMO transmission signal.

17. The MIMO preprocessing apparatus as defined in any one of embodiments 14 to 16,
wherein said MIMO multiplexer is configured to shift the stronger MIMO receive signal component of a MIMO transmission channel to a frequency channel at a higher frequency than the weaker MIMO receive signal component of the same MIMO transmission channel.

18. The MIMO preprocessing apparatus as defined in any one of embodiments 14 to 17,
further comprising a signaling extraction unit for determining said channel allocation information based on a power measurement of said MIMO transmission signal.

19. A MIMO preprocessing method comprising:
receiving a MIMO transmission signal comprising at least two MIMO transmission signal streams received via different input signal paths, wherein said MIMO transmission signal comprises one or more MIMO transmission channels and wherein a MIMO transmission channel carrying one or more services comprises two MIMO receive signal components covering the same frequency channel and being included in different transmission signal streams,
multiplexing the two MIMO receive signal components of one or more MIMO transmission channels onto a multiplex signal, wherein the two MIMO receive signal components of said one or more MIMO transmission channels are allocated to different frequency channels based on channel allocation information derived from said MIMO transmission signal or received from a MIMO receiving apparatus, and
outputting said multiplex signal to an output signal path.

20. A MIMO receiving system comprising:
a MIMO antenna apparatus that receives a MIMO transmission signal comprising at least two MIMO transmission signal streams, wherein said MIMO transmission signal comprises one or more MIMO transmission channels and wherein a MIMO transmission channel carrying one or more services comprises two MIMO receive signal components covering the same frequency channel and being included in different transmission signal streams, a MIMO preprocessing apparatus as defined in anyone of embodiments 14 to 17 that preprocesses said MIMO transmission signal and outputs a multiplex signal, and
one or more receiving apparatus as defined in anyone of embodiments 1 to 12 that receive said multiplex signal from said output signal path to use a service contained in said single multiplex signal and output a service data stream.

21. A computer program comprising program code means for causing a computer to perform the steps of said method as defined in embodiment 13 or 19 when said computer program is carried out on a computer.

22. A non-transitory computer-readable recording medium that stores therein a computer program product, which, when executed by a processor, causes the method according to embodiment 13 or 19 to be performed.

23. A MIMO transmitting apparatus comprising:
an input processing unit receiving input data to be transmitted,
a Bit Interleaved Coding and Modulation unit that encodes and modulates the received input data and signaling information, said signaling information comprising a channel allocation information indicating the allocation of two MIMO receive signal components of at least a MIMO transmission channel carrying a desired service that shall be used by a MIMO receiving apparatus to respective frequency channels so that the two MIMO receive signal components of said MIMO transmission channel will be allocated to different frequency channels,
a MIMO encoding unit that MIMO encodes the output signals of the Bit Interleaved Coding and Modulation unit to obtain two MIMO encoded signal streams,
two MIMO transmission antennas that transmit said MIMO encoded signal streams as MIMO transmission signal, wherein said MIMO transmission signal comprises one or more MIMO transmission channels and wherein a MIMO transmission channel carrying one or more services comprises two MIMO receive signal components covering the same frequency channel and being included in different MIMO encoded streams.

24. A MIMO transmitting method comprising:
receiving input data to be transmitted,
encoding and modulating the received input data and signaling information, said signaling information comprising a channel allocation information indicating the allocation of two MIMO receive signal components of at least a MIMO transmission channel carrying a desired service that shall be used by a MIMO receiving apparatus to respective frequency channels so that the two MIMO receive signal components of said MIMO transmission channel will be allocated to different frequency channels,
MIMO encoding the output signals of the Bit Interleaved Coding and Modulation unit to obtain two MIMO encoded signal streams,
transmitting said MIMO encoded signal streams as MIMO transmission signal, wherein said MIMO transmission signal comprises one or more MIMO transmission channels and wherein a MIMO transmission channel carrying one or more services comprises two MIMO receive signal components covering the same frequency channel and being included in different MIMO encoded streams.

The invention claimed is:

1. A multiple input multiple output (MIMO) receiving apparatus, comprising:
an input interface configured to receive a multiplex signal from a MIMO preprocessing apparatus on an input signal path, said multiplex signal including one or more MIMO transmission channels of a MIMO transmission signal, wherein a MIMO transmission channel of the one or more MIMO transmission channels carrying one or more services includes two MIMO receive signal components multiplexed onto said multiplex signal;
signaling circuitry configured to signal, to said MIMO preprocessing apparatus, channel allocation information indicating an allocation of the two MIMO receive signal components of the MIMO transmission channel carrying a desired service to respective frequency channels so that the two MIMO receive signal components will be allocated to different frequency channels;
a processor configured to process the two MIMO receive signal components, of the MIMO transmission channel carrying the desired service, by tuning the two MIMO receive signal components to the frequency channels of the respective MIMO receive signal component based on said channel allocation information to obtain a service data stream; and
an output interface configured to output said service data stream.

2. The MIMO receiving apparatus as claimed in claim 1, further comprising:
signaling extraction circuitry configured to derive said channel allocation information.

3. The MIMO receiving apparatus as claimed in claim 2, wherein said signaling extraction circuitry is configured to derive said channel allocation information based on a power measurement of said multiplex signal.

4. The MIMO receiving apparatus as claimed in claim 3, wherein said signaling extraction circuitry is configured to derive a list of available frequency channels, indicating which frequency channels are not occupied, or a list of predetermined channel assignments, indicating to which frequency channels the MIMO receive signal components of said one or more MIMO transmission channels are to be allocated, as channel allocation information.

5. The MIMO receiving apparatus as claimed in claim 4, wherein said channel allocation information contains channel numbers, absolute frequencies or relative frequencies indicating frequency channels.

6. The MIMO receiving apparatus as claimed in claim 1, wherein said signaling circuitry is configured to signal to said MIMO preprocessing apparatus a service information indicating which desired service said MIMO receiving apparatus wants to use.

7. The MIMO receiving apparatus as claimed in claim 1, wherein said input interface is configured to receive channel occupation information indicating to which frequency channels the MIMO receive signal components of one or more MIMO transmission channels have actually been allocated.

8. The MIMO receiving apparatus as claimed in claim 1, wherein said input interface is configured to receive, and said signaling circuitry is configured to signal, information using the Digital Satellite Equipment Control protocol or the JULTEC Enhanced Stacking System protocol.

9. The MIMO receiving apparatus as claimed in claim 1, wherein said input interface is configured to exchange channel allocation information indicating to which frequency channels the MIMO receive signal components of one or more MIMO transmission channels are to be allocated or channel occupation information channel occupation information indicating to which frequency channels the MIMO receive signal components of one or more MIMO transmission channels have actually been allocated with a channel information database.

10. A multiple input multiple output (MIMO) receiving method, comprising:
receiving a multiplex signal, from a MIMO preprocessing apparatus on an input signal path, said multiplex signal including one or more MIMO transmission channels of a MIMO transmission signal, wherein a MIMO transmission channel of the one or more MIMO transmission channels carrying one or more services includes two MIMO receive signal components multiplexed onto said multiplex signal;
signaling, to said MIMO preprocessing apparatus, channel allocation information indicating the allocation of the two MIMO receive signal components of a MIMO transmission channel carrying a desired service that shall be used by said MIMO receiving method to respective frequency channels, so that the two MIMO receive signal components will be allocated to different frequency channels;
processing, by circuitry, the two MIMO receive signal components, of the MIMO transmission channel carrying the desired service, by tuning the two MIMO receive signal components to the frequency channel of the respective MIMO receive signal component based on said channel allocation information to obtain a service data stream; and
outputting said service data stream.

11. A multiple input multiple output (MIMO) preprocessing apparatus, comprising:
an input interface configured to receive a MIMO transmission signal including at least two MIMO transmission signal streams received via different input signal paths, wherein said MIMO transmission signal includes one or more MIMO transmission channels, and wherein a MIMO transmission channel of the one or more MIMO transmission channels carrying one or more services includes two MIMO receive signal components covering a same frequency channel and being included in different transmission signal streams;
a MIMO multiplexer configured to multiplex the two MIMO receive signal components of the one or more MIMO transmission channels onto a multiplex signal, wherein the two MIMO receive signal components are allocated to different frequency channels based on channel allocation information derived from said MIMO transmission signal or received from a MIMO receiving apparatus; and
an output interface configured to output said multiplex signal to an output signal path.

12. The MIMO preprocessing apparatus as claimed in claim 11, wherein said MIMO multiplexer is configured to multiplex the two MIMO receive signal components of all MIMO transmission channels onto said single multiplex signal based on a list of predetermined channel assignments, indicating to which frequency channels the MIMO receive signal components of said one or more MIMO transmission channels are to be allocated, as channel allocation information.

13. The MIMO preprocessing apparatus as claimed in claim 11, wherein said MIMO multiplexer is configured to shift only one or both of the two MIMO receive signal components of one or more MIMO transmission channels to a different frequency channel than the frequency channel in which the MIMO receive signal components are included in the MIMO transmission signal or to shift the stronger MIMO receive signal component of a MIMO transmission channel to a frequency channel at a higher frequency than the weaker MIMO receive signal component of the same MIMO transmission channel.

14. The MIMO preprocessing apparatus as claimed in claim 11, further comprising:
signaling extraction circuitry configured to determine said channel allocation information based on a power measurement of said MIMO transmission signal.

15. A multiple input multiple output (MIMO) preprocessing method, comprising:
receiving a MIMO transmission signal that includes at least two MIMO transmission signal streams received via different input signal paths, wherein said MIMO transmission signal includes one or more MIMO transmission channels and wherein a MIMO transmission channel carrying one or more services includes two MIMO receive signal components covering the same frequency channel and being included in different transmission signal streams;
multiplexing, by circuitry, the two MIMO receive signal components of the one or more MIMO transmission channels onto a multiplex signal, wherein the two MIMO receive signal components are allocated to different frequency channels based on channel allocation information derived from said MIMO transmission signal or received from a MIMO receiving apparatus; and
outputting said multiplex signal to an output signal path.

16. A multiple input multiple output (MIMO) receiving system, comprising:
a MIMO antenna apparatus configured to receive a MIMO transmission signal that includes at least two MIMO transmission signal streams, wherein said MIMO transmission signal includes one or more MIMO transmission channels and wherein a MIMO transmission channel carrying one or more services includes two MIMO receive signal components covering the same frequency channel and being included in different transmission signal streams;
a MIMO preprocessing apparatus as claimed in claim 11 that preprocesses said MIMO transmission signal and outputs a multiplex signal; and
one or more receiving apparatus that receives said multiplex signal from said output signal path to use a service contained in said single multiplex signal and output a service data stream.

17. A non-transitory computer-readable medium including computer program instructions, which, when executed by a computer, causes the computer to perform the method according to claim 10.

18. A multiple input multiple output (MIMO) transmitting apparatus, comprising:
input processing circuitry configured to receive input data to be transmitted;
Bit Interleaved Coding and Modulation (BICM) circuitry configured to encode and modulate the received input data and signaling information, said signaling information including channel allocation information indicating an allocation of two MIMO receive signal components of at least a MIMO transmission channel carrying a desired service that shall be used by a MIMO receiving apparatus to respective frequency channels so that the two MIMO receive signal components of said MIMO transmission channel will be allocated to different frequency channels;
MIMO encoding circuitry configured to encode the output signals of the BICM circuitry to obtain two MIMO encoded signal streams; and
two MIMO transmission antennas configured to transmit said MIMO encoded signal streams as a MIMO transmission signal, wherein
said MIMO transmission signal includes one or more MIMO transmission channels, and
a MIMO transmission channel carrying one or more services includes two MIMO receive signal components covering the same frequency channel and being included in different MIMO encoded streams.

19. A multiple input multiple output (MIMO) transmitting method, comprising:
receiving input data to be transmitted;
encoding and modulating, by Bit Interleaved Coding and Modulation (BICM) circuitry, the received input data and signaling information, said signaling information includes channel allocation information indicating the allocation of two MIMO receive signal components of at least a MIMO transmission channel carrying a desired service that shall be used by a MIMO receiving apparatus to respective frequency channels so that the two MIMO receive signal components of said MIMO transmission channel will be allocated to different frequency channels;
MIMO encoding the output signals of the BICM circuitry to obtain two MIMO encoded signal streams; and
transmitting, by circuitry, said MIMO encoded signal streams as a MIMO transmission signal, wherein
said MIMO transmission signal includes one or more MIMO transmission channels, and
a MIMO transmission channel carrying one or more services includes two MIMO receive signal components covering the same frequency channel and being included in different MIMO encoded streams.

20. A non-transitory computer-readable medium including computer program instructions, which, when executed by a computer, causes the computer to perform the method according to claim 15.

* * * * *